United States Patent
He et al.

(10) Patent No.: US 6,543,227 B2
(45) Date of Patent: Apr. 8, 2003

(54) AUTOMATED ACTIVE VARIABLE GEOMETRY TURBOCHARGER DIAGNOSIS SYSTEM

(75) Inventors: Chuan He, Columbus, IN (US); Paul R. Miller, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 45 days.

(21) Appl. No.: 09/774,961

(22) Filed: Jan. 31, 2001

(65) Prior Publication Data

US 2002/0100278 A1 Aug. 1, 2002

(51) Int. Cl.$^7$ .............................................. F02D 23/00
(52) U.S. Cl. ...................... 60/602; 123/397; 73/118.1
(58) Field of Search ........................... 60/605.2, 605.1, 60/602; 73/118.1; 123/397

(56) References Cited

U.S. PATENT DOCUMENTS

| | | | | |
|---|---|---|---|---|
| 4,142,608 A | * | 3/1979 | Sarle ........................ | 417/407 |
| 4,292,806 A | | 10/1981 | Moore et al. | |
| 4,292,807 A | | 10/1981 | Rannenberg | |
| 4,594,668 A | | 6/1986 | Fujawa et al. | |
| 5,123,246 A | | 6/1992 | Younessi et al. .............. | 60/602 |
| 5,309,883 A | * | 5/1994 | Pischke ....................... | 123/397 |
| 5,765,532 A | | 6/1998 | Loye | |
| 5,878,717 A | | 3/1999 | Zur Loye | |
| 5,894,731 A | * | 4/1999 | Hakansson ................... | 60/602 |
| 5,987,888 A | | 11/1999 | Weismann, II et al. .... | 60/605.1 |
| 6,000,221 A | | 12/1999 | Church et al. ................ | 60/602 |
| 6,035,639 A | | 3/2000 | Kolmanovsky et al. .... | 60/605.2 |
| 6,035,640 A | | 3/2000 | Kolmanovsky et al. .... | 60/605.2 |
| 6,055,810 A | | 5/2000 | Borland et al. ............ | 60/605.2 |
| 6,055,812 A | | 5/2000 | Trumbower | |
| 6,298,718 B1 | * | 10/2001 | Wang ........................ | 73/118.1 |
| 6,314,734 B1 | * | 11/2001 | Enander ...................... | 60/602 |

FOREIGN PATENT DOCUMENTS

JP          11148885 A    *  6/1999

* cited by examiner

Primary Examiner—Thomas Denion
Assistant Examiner—Thai-Ba Trieu
(74) Attorney, Agent, or Firm—Woodard, Emhardt, Naughton Moriarty & McNett LLP (57) ABSTRACT

The present invention relates to an engine diagnostic system for detecting malfunctions in an engine system having a variable geometry turbine exhaust system. The engine diagnosis system includes an electronic control module adapted to periodically initiate a preprogrammed variable geometry turbine diagnostic routine. The diagnostic routine includes the operations of sending a sinusoidal control signal to a pressure regulator, determining the configuration of the variable geometry turbine, determining the pressure of a capsule, calculating the configuration of the variable geometry turbine as a function of the sinusoidal control signal, calculating the pressure of the capsule as a function of the sinusoidal control signal, determining if a pressure sensor is in calibration, determining if the pressure regulator is malfunctioning, determining if the variable geometry turbine position sensor is in calibration, determining if the variable geometry turbine is malfunctioning, and displaying the results of the test.

15 Claims, 9 Drawing Sheets

AUTOMATED ACTIVE VARIABLE GEOMETRY TURBOCHARGER DIAGNOSIS SYSTEM

TECHNICAL FIELD OF THE INVENTION

The present invention relates generally to internal combustion engines and, more particularly, to an active electronic diagnostic system for automatically testing an engine exhaust system having a variable geometry turbocharger to detect and report exhaust system operation.

BACKGROUND OF THE INVENTION

Turbochargers can be used to increase the efficiency of both Otto cycle and diesel engines by increasing the amount of oxygen available for combustion. Turbochargers generally consist of a turbine wheel mounted in the exhaust manifold and driven by the escaping exhaust gasses. The turbine wheel is coupled to a compressor, such that the turning turbine energizes the compressor to increase the pressure of the intake air supplied to the engine. The turbine recaptures energy from the expanding hot exhaust gasses to actuate the compressor. The compressor typically provides air to the engine's intake manifold at pressures up to several times that of atmospheric. The pressurized air contains more oxygen per unit volume than unpressurized air, allowing for increased engine efficiency.

Variable geometry turbocharger systems (VGTs) have been developed to overcome a limitation of turbochargers having turbine inlet nozzles and compressor discharge nozzles of fixed shapes and dimensions. Such fixed geometry turbochargers contributed to increased engine efficiency at one point on the range of engine torque requirements, but not over the engine's entire operating range. In other words, a fixed geometry turbocharger designed to optimize engine operation at high RPM and air volume flows will not perform as efficiently at low RPMs and volume flows, and vice-versa. In fact, operation of a fixed geometry turbocharger under conditions sufficiently far removed from its design point could actually decrease the efficiency of engine operation and contribute to engine damage. The usual solution, employing an intermediate range turbocharger, minimized the occasions when the turbocharger would perform inefficiently, but did not eliminate them. VGTs allow for variance in the geometry of the turbine inlet and compressor discharge nozzles to give the turbocharger an RPM/air volume flow range commensurate with the engine operating range, over which it increases/optimizes engine operating efficiency.

One advantage provided by a VGT is that the geometry of the turbine inlet nozzles and/or compressor discharge nozzles is varied by changing the cross-sectional flow area of the respective nozzle (i.e., by moving a portion of the nozzle housing) or by rotating the angle of the nozzle vanes (if the nozzle is of the vaned variety). One problem associated with VGTs is that they are prone to sticking. VGTs are, by their nature, positioned in a hostile environment of very hot gasses containing waste products of the combustion process. Build-up of partially burned hydrocarbons and particulate matter on the moving parts of the VGT system may cause them to stick. Also, stresses on the VGT parts arising from the extreme temperatures and temperature differentials experienced as hot exhaust gasses flow thereover may result in the moving parts jamming or sticking. Finally, the VGT is especially prone to wear damage as it consists of moving parts situated in a hostile environment.

If the VGT is sticking or jamming, the efficiency of the engine will be impaired. Improper exhaust back pressure will result in decreased fuel efficiency, and may further lead to the engine stalling and possibly even to engine damage.

There is therefore a need for a reliable system for detecting and diagnosing malfunctions in the VGT system. The present invention is directed towards meeting this need.

SUMMARY OF THE INVENTION

The present invention relates to an engine diagnostic system for detecting malfunctions in an engine system having a variable geometry turbine exhaust system. The engine diagnosis system includes a variable geometry turbine adapted to receive exhaust gasses exiting an engine, a variable geometry turbine position sensor operationally connected to the variable geometry turbine, a compressed air reserve, a pressure capsule pneumatically connected between the compressed air reserve and the variable geometry turbine, a pressure regulator pneumatically connected between the compressed air reserve and the capsule, a pressure sensor pneumatically connected between the pressure regulator and the capsule, and an electronic control module electrically connected to the variable geometry turbine position sensor, to the pressure regulator, and to the pressure sensor. The sensors may be integrally connected to the engine exhaust system, or may be part of a diagnostic station. The electronic control module is adapted to periodically initiate a preprogrammed variable geometry turbine diagnostic routine.

The diagnostic routine includes the operations of sending a sinusoidal control signal to the pressure regulator, determining the configuration of the variable geometry turbine, determining the pressure of the capsule, calculating the configuration of the variable geometry turbine as a function of the sinusoidal control signal, calculating the pressure of the capsule as a function of the sinusoidal control signal, determining if the pressure sensor is in calibration, determining if the pressure regulator is malfunctioning, determining if the variable geometry turbine position sensor is in calibration, determining if the variable geometry turbine is malfunctioning, and displaying the results of the test.

One object of the present invention is to provide an improved VGT system for maintaining the exhaust gas of an internal combustion engine system at an optimum pressure. Related objects and advantages of the present invention will be apparent from the following description.

DETAILED DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
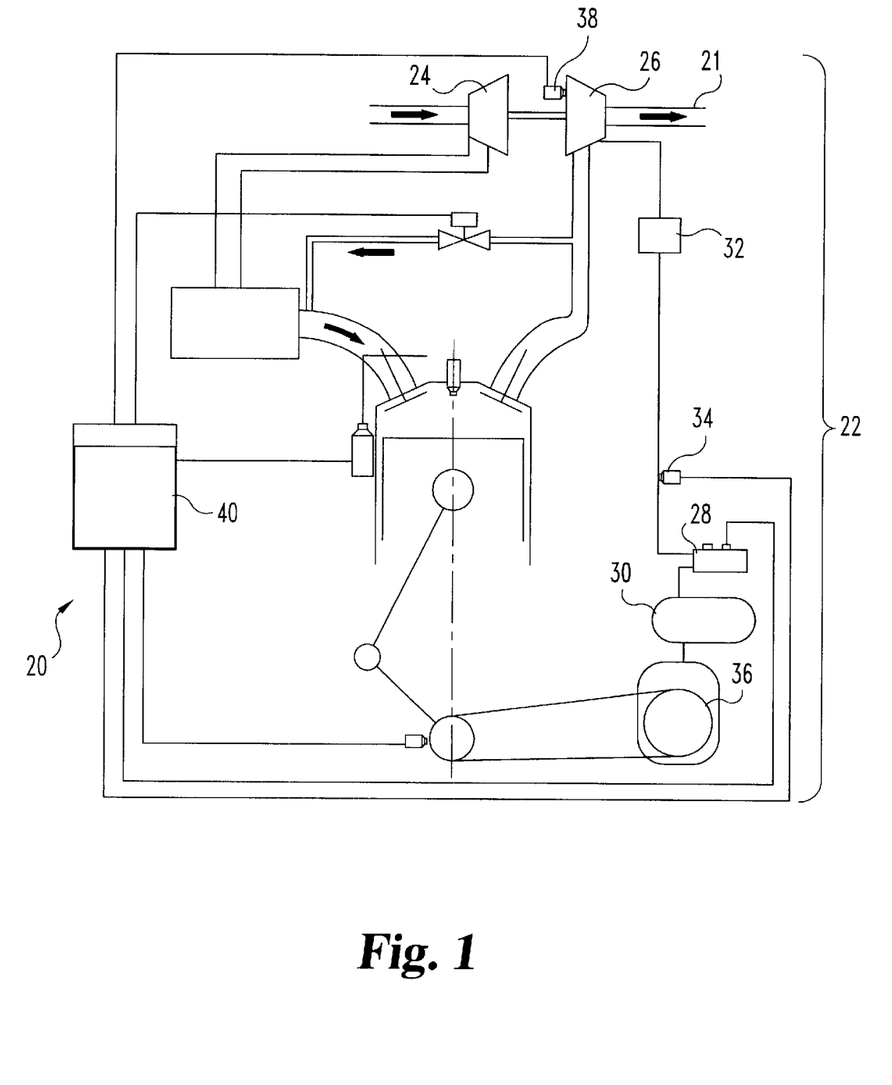
FIG. 1 is a schematic view of the variable geometry turbine diagnostic system of a first embodiment of the present invention.
Figure 2A:
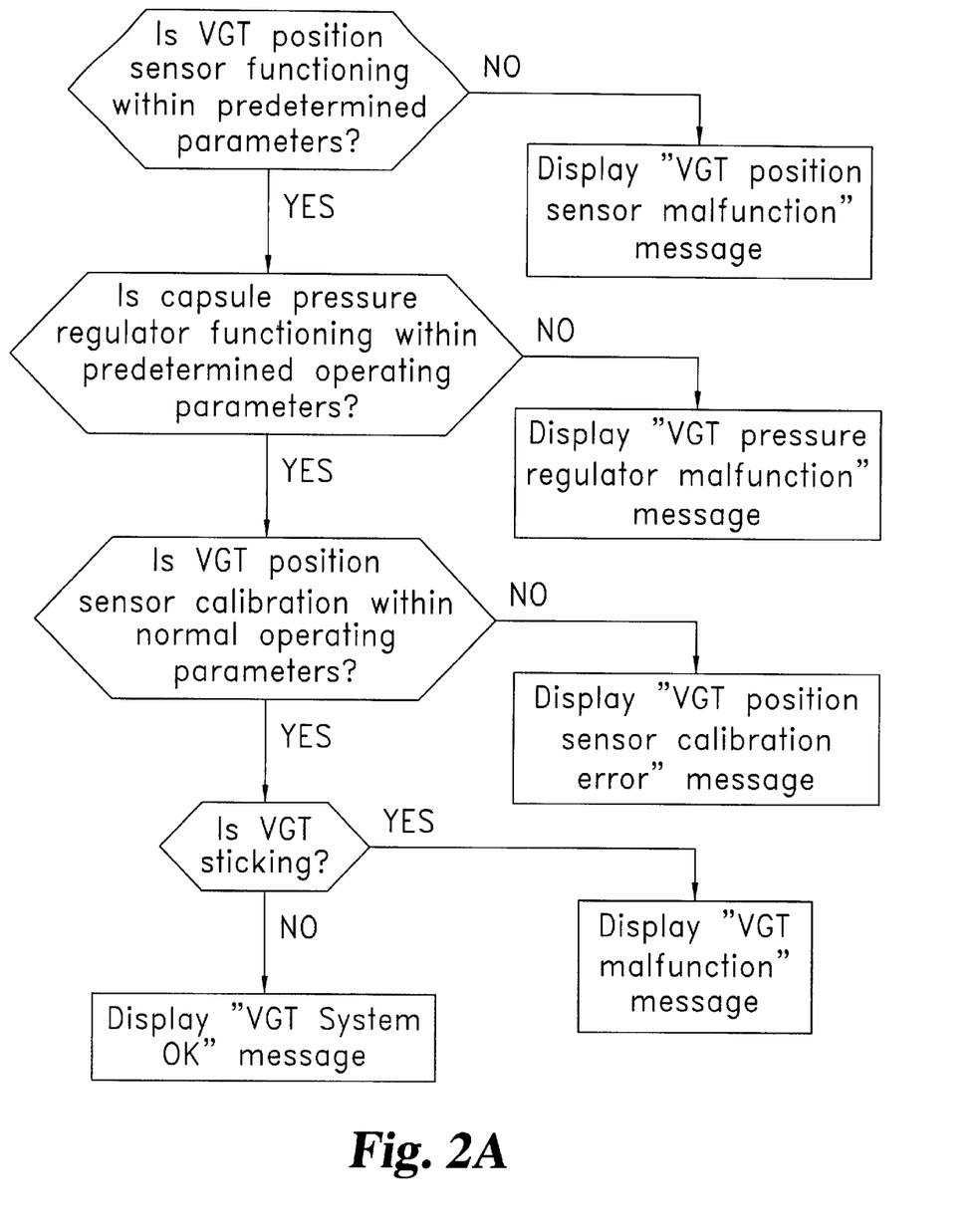
FIG. 2A is a flow chart illustrating the variable geometry turbine self test logic used with the embodiment of FIG. 1.
Figure 2B:
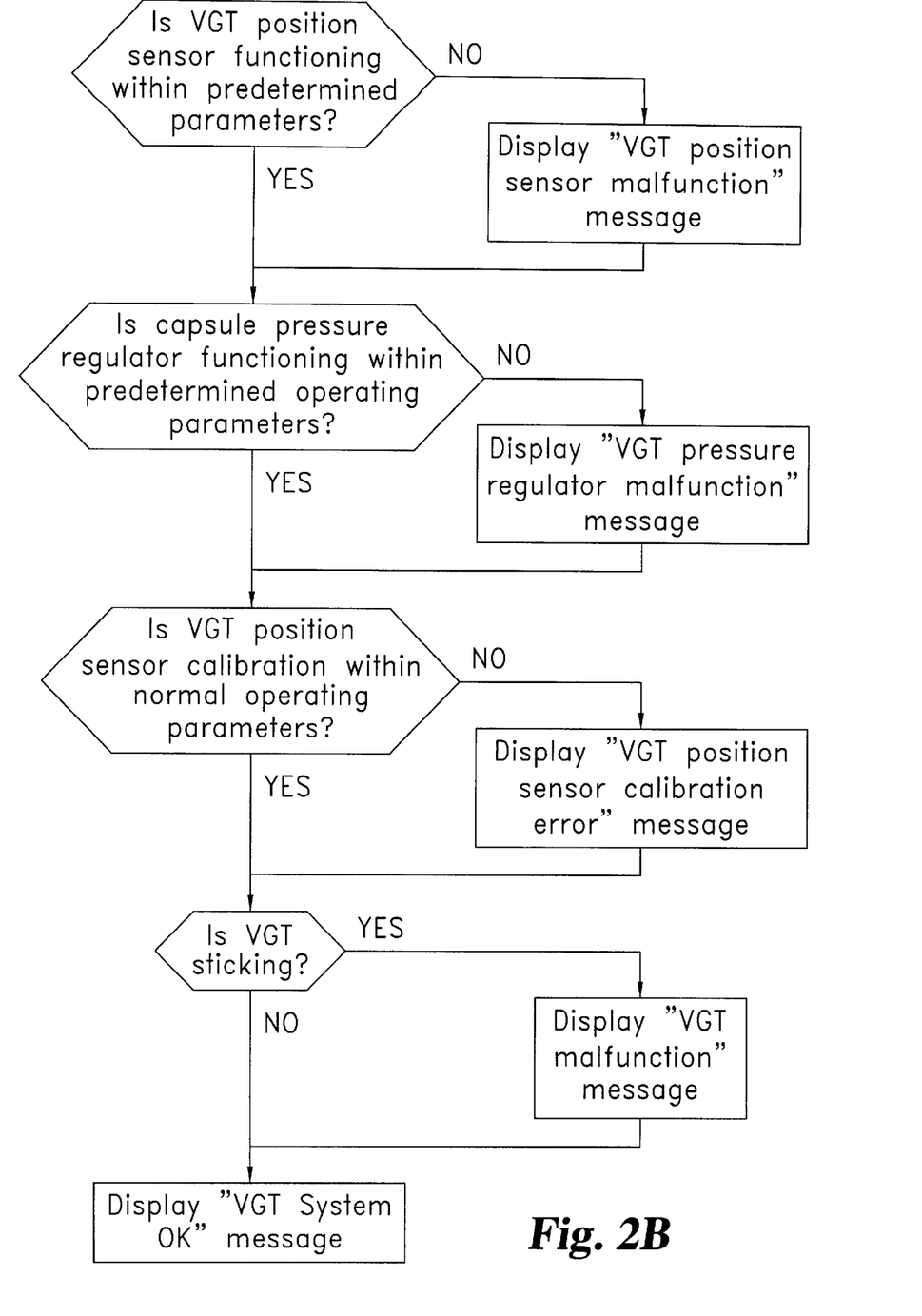
FIG. 2B is a flow chart illustrating a second embodiment variable geometry turbine diagnostic system of the present invention.

FIG. 1 schematically illustrates a first embodiment of the present invention, an engine system 20 including a variable geometry turbine or VGT 22. The engine system 20 includes an air intake manifold for drawing air into the engine system fluidically connected to an air cooler. Intake air is cooled in the air cooler before being drawn through an intake valve and mixed with fuel vapor in a combustion chamber. The fuel vapor is introduced into the combustion chamber by a fuel injector fed by a fuel pump connected to a fuel supply. After the fuel-air mixture is combusted, exhaust gasses are expelled from the combustion chamber through an exhaust valve. Some of the exhaust gasses are reintroduced into the intake air flow through an EGR valve while the remaining exhaust gasses are expelled from the engine system 20 through the exhaust orifice 21.

The VGT 22 is positioned to receive exhaust gasses generated by the engine system 20 when in operation. The VGT 22 includes a compressor 24 operationally connected to a turbine 26. The compressor 24 functions to compress intake air for the engine system 20. The turbine 26 has a changeable nozzle open area, which allows adjustment of the velocity of the exhaust gasses flowing therethrough and out the exhaust orifice 21. The turbine nozzle open area is adjusted by compressed air regulated by a pressure regulator 28 pneumatically connected between an air tank 30 and the turbine 26. The pressure regulator 28 is preferably a proportionally controllable electronically actuated pressure regulator. A capsule 32 is preferably pneumatically connected between the pressure regulator 28 and the turbine 26. A pressure sensor 34 is operationally connected between the air tank 30 and the turbine 26, and is preferably connected near the capsule 32. While this embodiment preferably envisions the pressure sensor 34 as integral to the VGT system 22, the pressure sensor 34 may be an independent unit temporarily operationally connected to the VGT system 22 for the duration of the diagnostic testing procedure. The capsule 32 operates to temporarily store compressed air for controlling the turbine 26.

The air tank 30 is pneumatically connected to an air pump 36. When the engine system 20 is running, the air pump 36 pressurizes the air tank 30. When the engine system 20 is shut off, the air tank 30 gradually becomes depressurized.

A VGT position sensor 38 is operationally connected to the turbine 26. While the VGT position sensor 38 is preferably integrally connected to the VGT system 22, the VGT position sensor 38 may also be an independent unit temporarily operationally connected to the VGT system 22 for the duration of the diagnostic testing procedure. The VGT position sensor 38 is preferably a potentiometer, but may be any convenient sensor capable of assessing the motion and position of the turbine 26. For example, VGT position sensor 38 may be a suitable electromechanical device or a suitable optical device. The VGT position sensor 38 functions to monitor and provide feedback information regarding the turbine configuration. Preferably, both the VGT position sensor 38 and the pressure sensor 34 are integral with the engine system 20, although one or both may be part of a diagnostic station or otherwise connected for the purposes of checking the function of the VGT system 22.

An electronic controller 40 is electrically connected to the pressure regulator 28, the pressure sensor 34, and the VGT position sensor 38. Preferably, the electronic controller is also adapted to receive direct input commands from an engine system operator. More preferably, the electronic controller 40 is in electronic communication with an engine speed sensor and one or more fuel pumps and/or fuel injectors providing fuel to the engine system 20. The electronic controller 40 is adapted to generate a sinusoidal control signal and transmit the control signal to the pressure regulator 28. The control signal actuates the pressure regulator 28 to send a sinusoidal pressure profile to the turbine 26, resulting in the turbine configuration changing sinusoidally. In other words, the sinusoidal control signal actuates a periodic opening and closing of the turbine 26 which, when plotted as a function of time, has the shape of a sine wave.

The electronic controller 40 preferably initiates the diagnosis process by generating a control sinusoidal signal having a duration of about 60 seconds, although shorter or longer duration control signals may be chosen. During the duration of the control signal, the electronic controller 40 receives and records input signals from the pressure sensor 34 and the VGT position sensor 38. The electronic controller 40 is then able to plot the data from the pressure sensor 34 and VGT position sensor 38 (i.e., the air pressure and VGT position data) individually as a function of time or of the sinusoidal signal or both. From this data, information regarding the calibration of the sensors 34, 38 and the status of the pressure regulator 28 and the turbine 26 may be calculated.

The electronic controller 40 is preferably programmed to initiate diagnosis of the VGT system 22 under a number of specific conditions. For example, the electronic controller 40 may be directed to initiate diagnosis by a command from an operator. Alternately, the electronic controller 40 may be programmed to initiate diagnosis of the VGT system 22 when the engine is in a prolonged idling state. A prolonged idling state might be defined by the engine running within +/−10% of a predetermined idling speed (as detected by the engine speed sensor) and with fueling less than 30% of a predetermined maximum amount (as controlled by the electronic controller 40) for a predetermined period of time (such as sixty seconds or five minutes, depending upon the desired frequency of testing). While the above parameters defining a prolonged idling time are preferred, any set of parameters may be chosen to define a desired prolonged idling period. A prolonged idling time is preferred since it both allows for sufficient pressure to be built up in the air tank 30 as well as keeping the testing frequency low to avoid excessive interference with the normal operation of the engine system 20. Additionally, the electronic controller 40 may be programmed to wait a minimum amount of time between tests to further avoid too frequent testing.

Likewise, the electronic controller 40 may be programmed to initiate diagnosis immediately following engine shut down, as detected by the engine speed sensor. Preferably, the electronic controller 40 is programmed to wait a predetermined length of time (such as one minute) after engine shut down before initiating diagnosis in order to allow the turbine sufficient time to come to rest without allowing enough time for the air tank 30 to depressurize. Conducting engine diagnosis after engine shut down allows isolated diagnosis of the VGT system 22 to occur when no other engine systems are in operation, thus minimizing the probability of confounding factors.

Preferably, the electronic controller 40 is programmed to abort the diagnosis if the test conditions are changed, such as by the throttle position changing, to eliminate degradation of engine performance due to the diagnosis as well as minimizing variables that could influence the test results.

Figure 5:
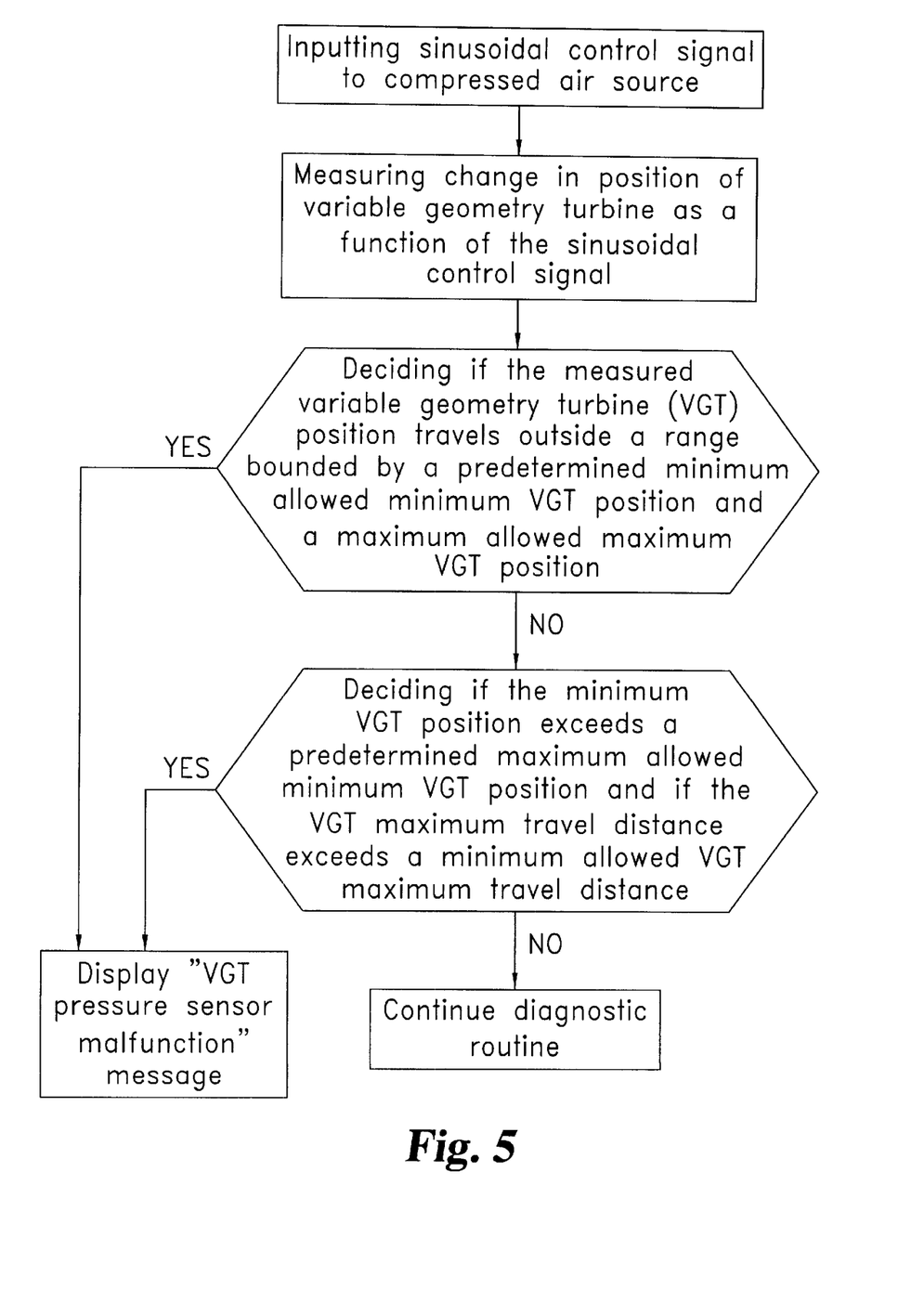
FIG. 5 is a flow chart illustrating the variable geometry turbine position sensor diagnostic routine of the embodiment of FIGS. 2A and 2B.
Figure 6:
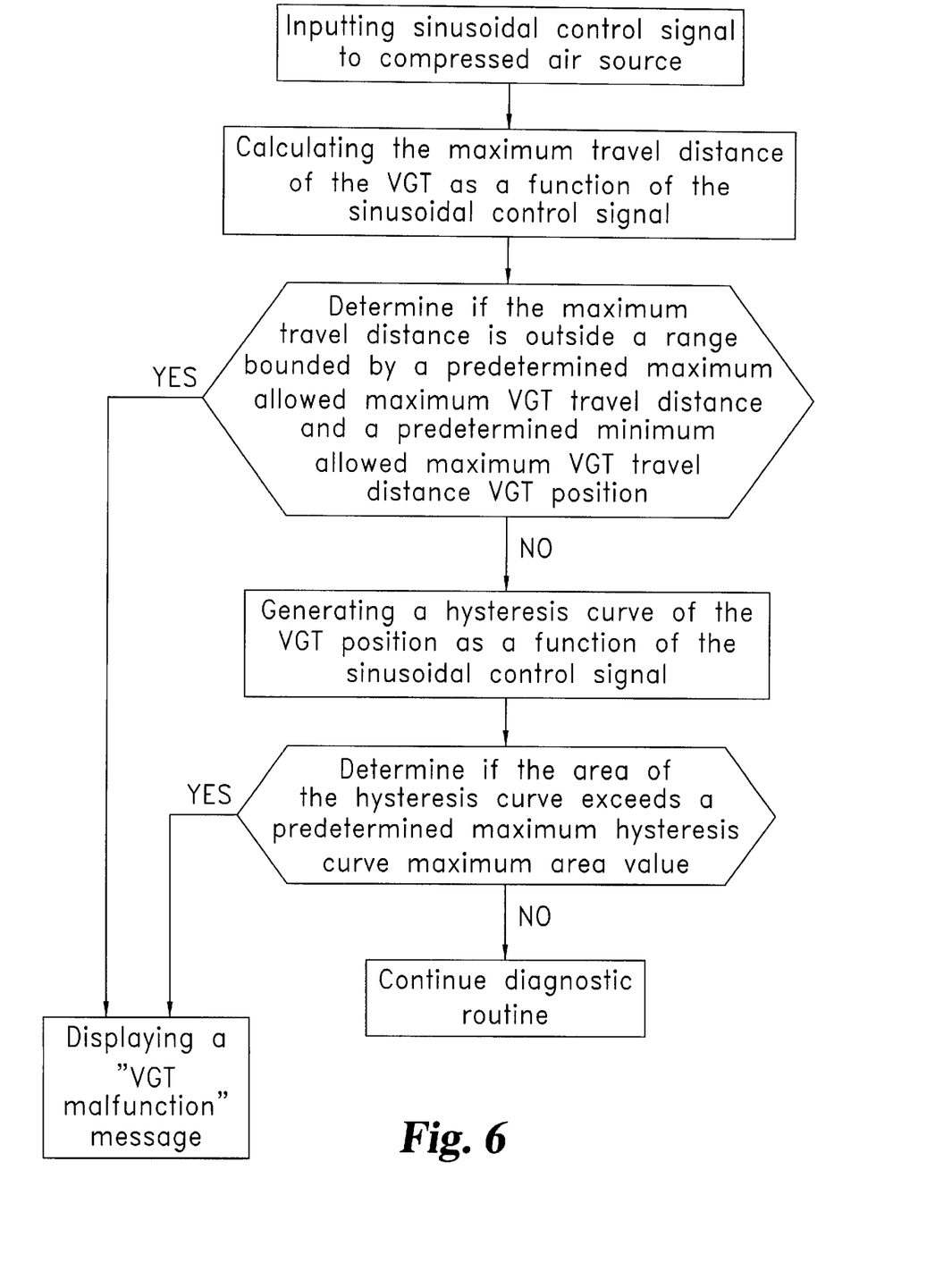
FIG. 6 is a flow chart illustrating the variable geometry turbine diagnostic routine of the embodiment of FIGS. 2A and 2B.
Figure 7:
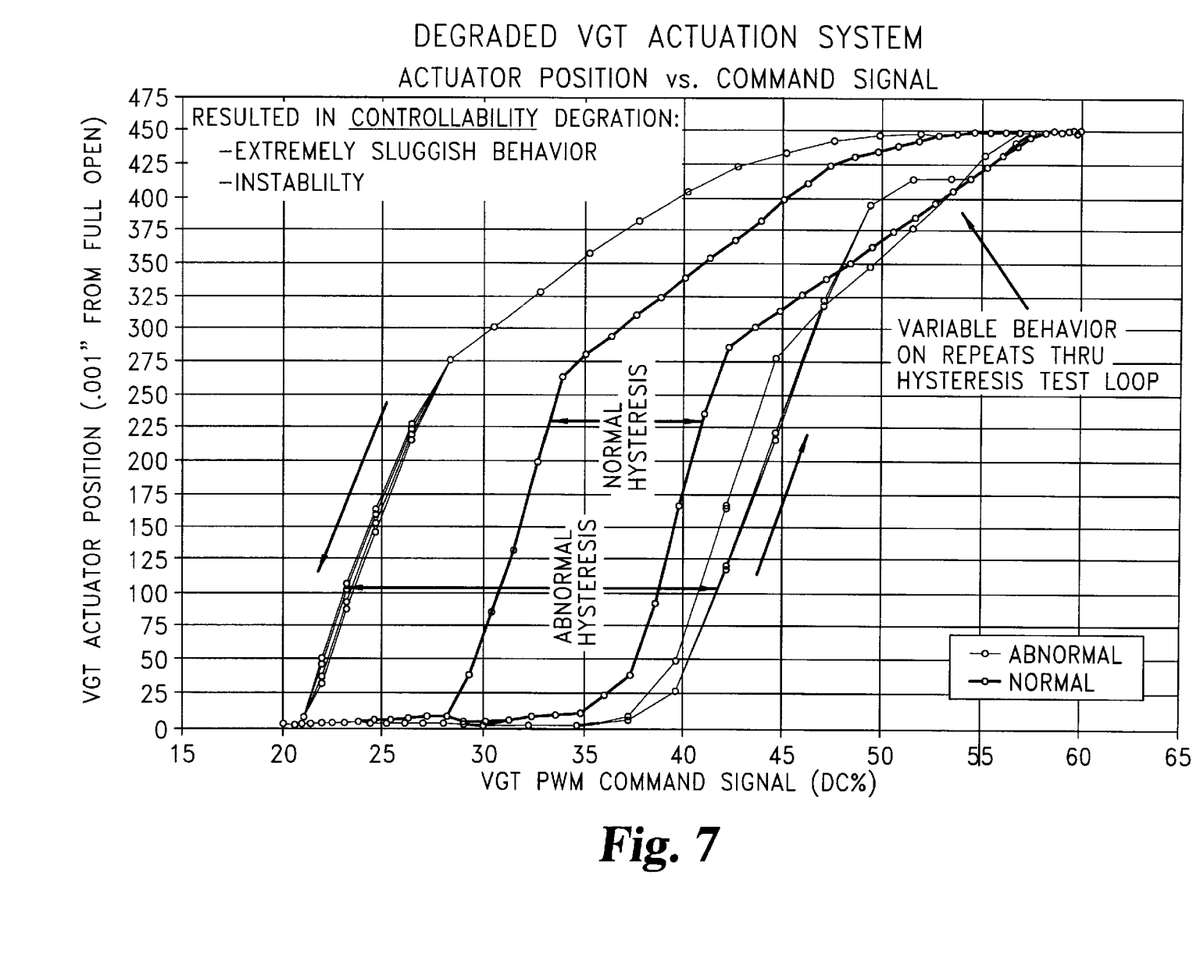
FIG. 7 graphically distinguishes a normal hysteresis curve from an abnormal hysteresis curve of the relationship between a VGT command signal and the VGT turbine position.
Figure 8:
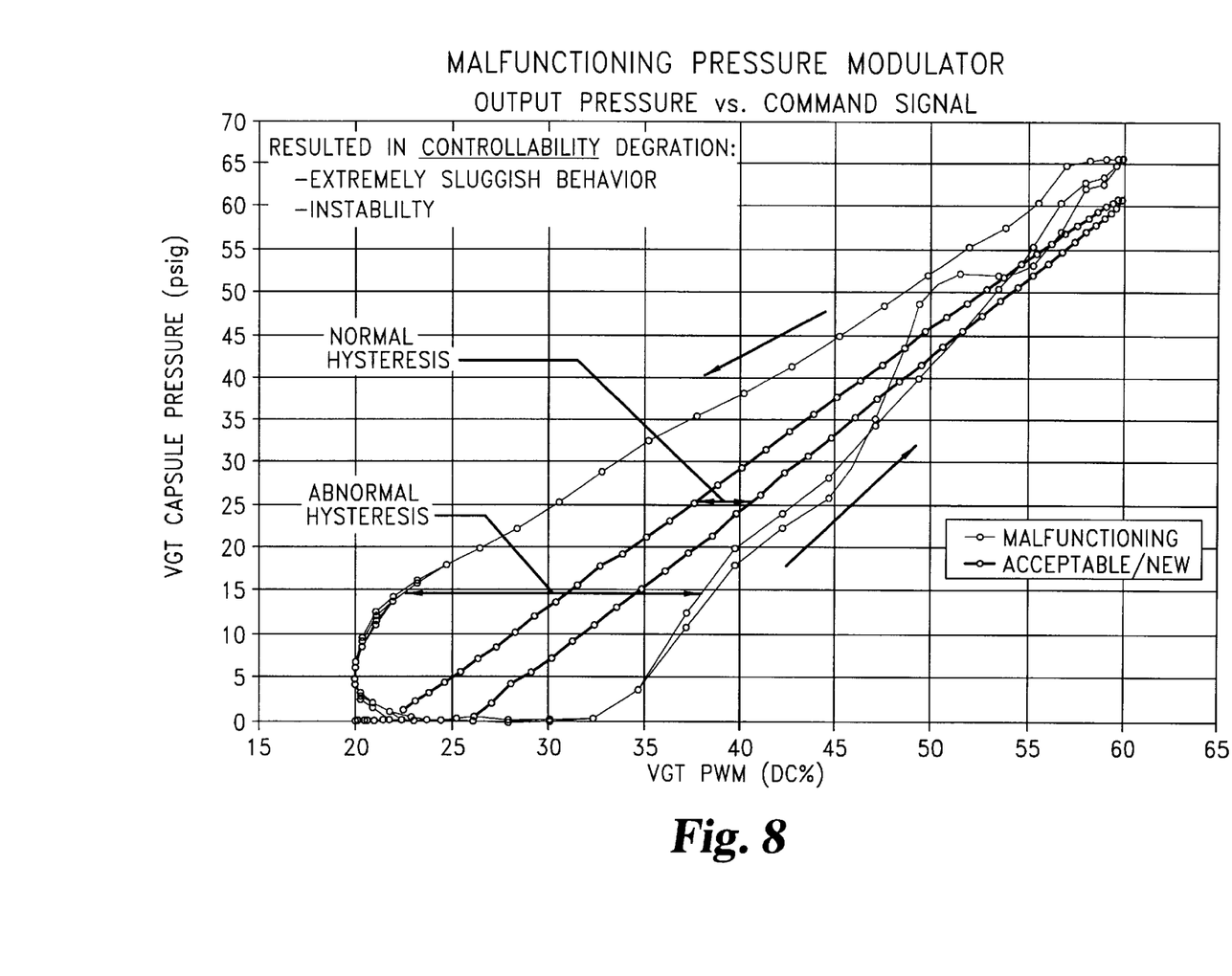
FIG. 8 graphically distinguishes a normal hysteresis curve from an abnormal hysteresis curve of the relationship between a VGT command signal and the VGT capsule pressure.

FIGS. 2–8 schematically illustrate the diagnosis process. During diagnosis, the electronic controller 40 preferably begins by overwriting the per-existing VGT command with a 5 second flat signal at pulse-width modulation (PWM)=0 to return the turbine 26 to a fully open position. Next, the electronic controller 40 generates a sinusoidal control signal to the pressure regulator 28 to actuate the turbine 26 to perform two full cycle movements (i.e., to move from the fully opened position to the fully closed position and back, twice). The electronic controller 40 receives separate data streams from the pressure sensor 34 and from the VGT position sensor 38 while the turbine 26 is cycling, and records the respective data streams as functions of time and/or the sinusoidal control signal. The electronic controller 40 also calculates and records the respective minimum and maximum positions of the turbine 26 and the respective minimum and maximum capsule 32 pressures as detected by the pressure sensor 34. The electronic controller 40 also calculates and records the respective maximum turbine travel distance and the capsule 32 pressure maximum difference. Additionally, the electronic controller 40 plots the hysteresis curve of the turbine position as a function of the command signal (i.e., the VGT hysteresis curve) and calculates the area of the VGT hysteresis curve (see FIG. 7). The electronic controller 40 also plots the hysteresis curve of the capsule 32 pressure as a function of the control signal (i.e., the capsule 32 pressure hysteresis curve) and calculates the area of the capsule 32 pressure hysteresis curve (see FIG. 8). FIGS. 7 and 8 illustrate the difference between typically normal hysteresis curves and abnormal hysteresis curves indicative of a malfunctioning turbine and a malfunctioning pressure regulator, respectively. The respective hysteresis responses are well known for VGT turbine systems that are functioning normally and can be characterized by the area defined within the normal hysteresis curve. The electronic controller 40 may therefore be programmed with maximum allowable area values for the respective hysteresis curves. The area of a measured hysteresis curve exceeding the predetermined maximum hysteresis value for that curve indicates a physical system (here, either the pressure regulator or the turbine) that is responding sluggishly to a command signal. In other words, the area of one or both hysteresis curves exceeding a predetermined threshold value for the VGT system 22 signals degradation in the controllability of the VGT system and a corresponding degradation in engine efficiency.

Referring back to FIGS. 2–6, the diagnosis logic is illustrated in detail. First, the electronic controller 40 sends a sinusoidal control signal to the pressure regulator. The electronic controller 40 then measures the position of the variable geometry turbine 26 as well as the pressure of the air tank/regulated compressed air source 30 (assumed to be equal to the capsule 32 pressure) for the duration of the control signal. The electronic controller 40 next respectively calculates the position of the variable geometry turbine 26 and the pressure of the compressed air source 30 as functions of the sinusoidal control signal. The electronic controller 40 then sequentially determines the calibration status of the pressure sensor 34, checks the operating status of the pressure regulator 28, determines the calibration status of the variable geometry turbine position sensor 38, and checks the operating status of the variable geometry turbine 26. The electronic controller 40 does this by comparing the calculated calibration values and operating status values (i.e., the areas of the respective calculated hysteresis curves) against respective predetermined normal operating parameters and/or threshold values. If any of the above-listed measured or calculated values deviate from the predetermined normal operating parameters and/or exceed the predetermined threshold values, an appropriate error message is generated and displayed, and further diagnostic testing is halted at that point.

Figure 3:
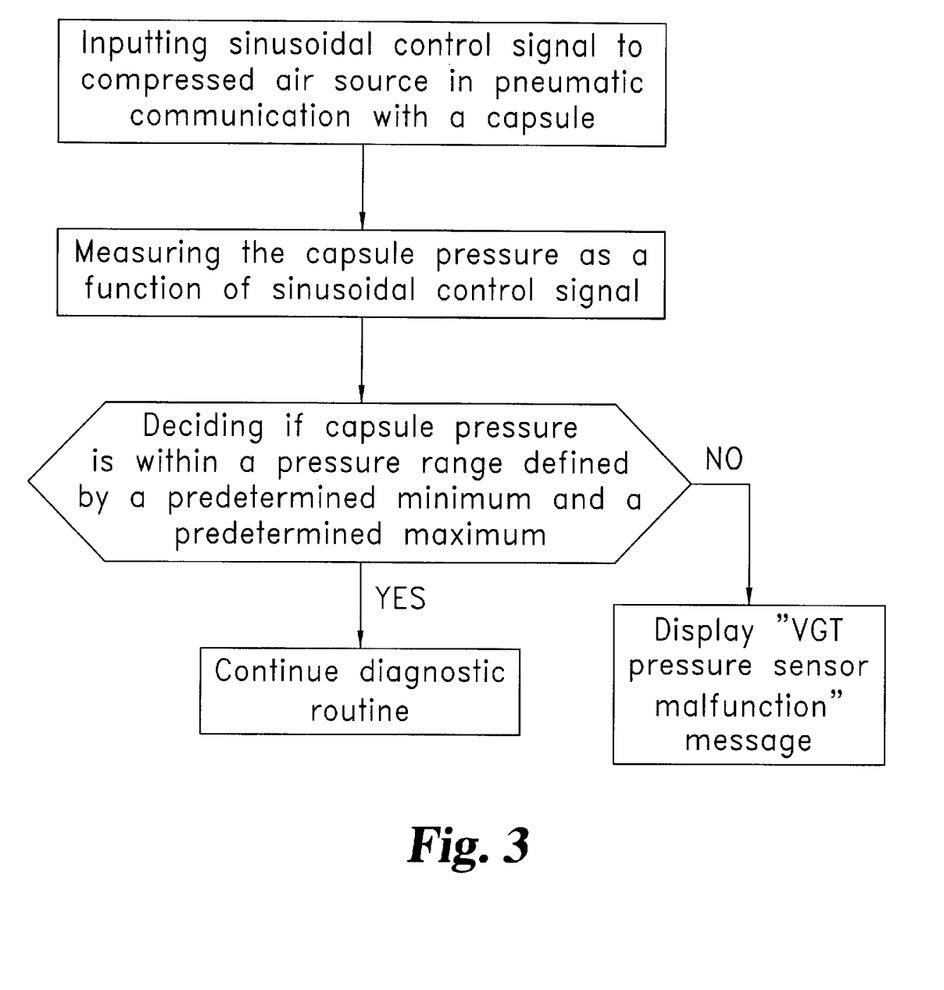
FIG. 3 is a flow chart illustrating the variable geometry turbine pressure sensor diagnostic routine of the embodiment of FIGS. 2A and 2B.

Specifically, the calibration status of the pressure sensor 34 is determined by first determining if the measured capsule 32 pressure is outside of a predetermined pressure range defined by a predetermined minimum capsule 32 pressure value and a predetermined maximum capsule 32 pressure value. Typically, this range is from about 25 psi to about 75 psi, but may vary with different engine designs or operating parameters. If the measured capsule 32 pressure is within the predetermined pressure range, the electronic controller 40 next determines if the minimum measured capsule 32 pressure is in excess of a predetermined maximum allowed minimum pressure value and if the maximum calculated capsule 32 pressure maximum difference is in excess of a predetermined minimum allowed capsule 32 pressure maximum difference value. In other words, the electronic controller 40 determines if the minimum capsule 32 pressure stays below some maximum threshold value and if the maximum capsule 32 pressure stays above some minimum threshold value over a sinusoidal cycle. The VGT system 22 requires a minimum capsule 32 pressure difference to ensure sufficient capsule 32 pressure to actuate movement of the turbine 26. Likewise, if the capsule 32 pressure exceeds a practical maximum value, control of the turbine 26 becomes difficult. The electronic controller 40 generates and displays a pressure sensor error message if the capsule 32 pressure is outside of a practical operating pressure range defined by a predetermined minimum and a predetermined maximum pressure value or if the minimum measured capsule 32 pressure is in excess of a predetermined maximum allowed minimum pressure value and if the maximum calculated capsule 32 pressure maximum difference is in excess of a predetermined minimum allowed capsule 32 pressure maximum difference value.

Figure 4:
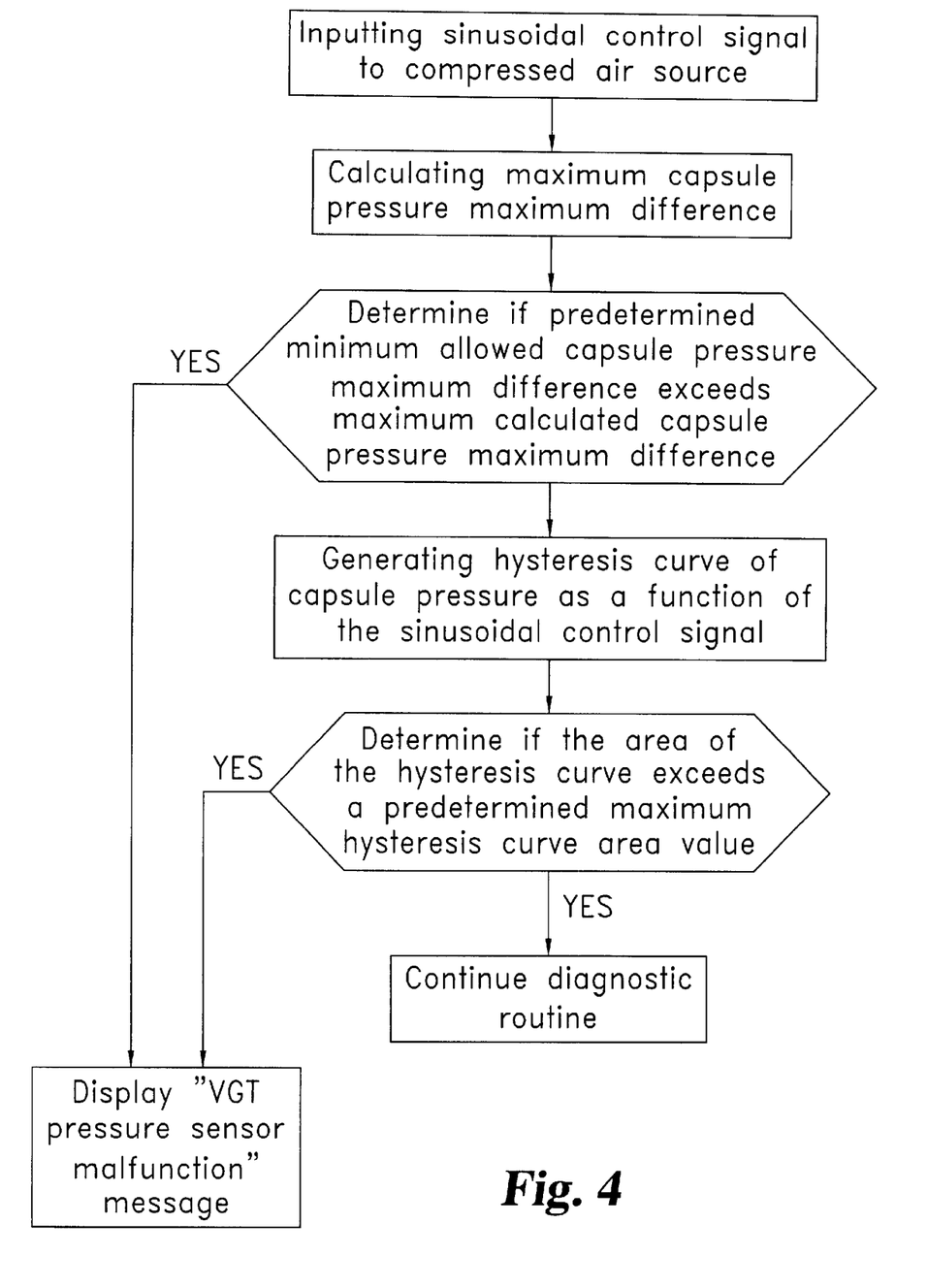
FIG. 4 is a flow chart illustrating the variable geometry turbine pressure regulator diagnostic routine of the embodiment of FIGS. 2A and 2B.

The electronic controller 40 checks the operating status of the pressure regulator 28 by first verifying that the pressure sensor 34 is functioning normally and, if so, then determining if a predetermined minimum allowed capsule 32 pressure maximum difference exceeds the maximum calculated capsule 32 pressure maximum difference. If not, the electronic controller 40 generates a hysteresis curve of the capsule 32 pressure as a function of the sinusoidal control signal for comparison to a predetermined maximum hysteresis curve area value. The electronic controller 40 generates and displays a compressed air source error message if the predetermined minimum allowed capsule 32 pressure maximum difference exceeds the maximum calculated capsule 32 pressure maximum difference or if the area of the hysteresis curve exceeds a predetermined maximum hysteresis curve area value.

The electronic controller 40 next determines the calibration status of the variable geometry turbine position sensor by first verifying that the pressure regulator 28 is functioning normally and, if so, then determining if a predetermined minimum variable geometry turbine minimum position exceeds the minimum measured variable geometry turbine position. If not, the electronic controller 40 then calculates the maximum travel distance of the variable geometry turbine 26 for comparison to a predetermined maximum variable geometry turbine maximum position and calculates the maximum travel distance of the variable geometry turbine 26 for comparison to a predetermined maximum variable geometry turbine travel distance value. The electronic controller 40 generates and displays a variable geometry turbine position sensor error message if a predetermined minimum variable geometry turbine minimum position exceeds the minimum measured variable geometry turbine position or if the maximum variable geometry turbine position exceeds a predetermined maximum variable geometry turbine maximum position and if the calculated maximum travel distance of the variable geometry turbine is in excess of a predetermined maximum variable geometry turbine travel distance value.

The electronic controller 40 then checks the operating status of the variable geometry turbine by first verifying that the variable geometry turbine position sensor is functioning normally and, if so, then calculating the maximum travel distance of the variable geometry turbine 26 as a function of the sinusoidal control signal. The electronic controller 40 next determines if the calculated variable geometry turbine travel distance is outside a range defined by a predetermined maximum variable geometry turbine travel distance and a predetermined minimum variable geometry turbine travel distance. If not, the electronic controller 40 generates a hysteresis curve of the variable geometry turbine position as a function of the sinusoidal control signal and compares it to a predetermined maximum hysteresis curve area value to determine if the area of the hysteresis curve exceeds the predetermined maximum hysteresis curve area value. The electronic controller 40 generates and displays a variable geometry turbine error message if the calculated variable geometry turbine travel distance is outside a range defined by a predetermined maximum variable geometry turbine travel distance and a predetermined minimum variable geometry turbine travel distance or if the area of the hysteresis curve exceeds a predetermined maximum hysteresis curve area value.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are to be desired to be protected.

What is claimed is:

1. An engine diagnostic system, comprising:
    a variable geometry turbine adapted to receive exhaust gasses exiting an engine;
    a variable geometry turbine position sensor operationally connected to the variable geometry turbine;
    a compressed air reserve;
    a capsule pneumatically connected between the compressed air reserve and the variable geometry turbine;
    a pressure regulator pneumatically connected between the compressed air reserve and the capsule;
    a pressure sensor pneumatically connected between the pressure regulator and the capsule; and
    an electronic controller electrically connected to the variable geometry turbine position sensor, to the pressure regulator, and to the pressure sensor;
    wherein the electronic controller is adapted to periodically initiate a variable geometry turbine diagnostic routine.

2. The system of claim 1 wherein the electronic controller is adapted to receive information from the pressure sensor and from the variable geometry turbine position sensor and wherein the electronic controller is adapted to send a command signal to the pressure regulator to actuate a change in the geometry of the variable geometry turbine.

3. The system of claim 2 wherein the command signal is sinusoidal.

4. The system of claim 1 wherein the diagnostic routine has a duration of about one minute.

5. The system of claim 1, wherein the compressed air reserve is an air tank and further comprising an air pump pneumatically connected to the air tank.

6. The system of claim 1 further comprising a vehicle and a diagnostic station operationally connectable to the vehicle; wherein the variable geometry turbine, the compressed air reserve, the capsule, the pressure regulator, and the pressure sensor are connected to the vehicle; and wherein the electronic controller and the variable geometry turbine position sensor are connected to the diagnostic station.

7. The system of claim 1 further comprising a vehicle and wherein the variable geometry turbine, the compressed air reserve, the capsule, the pressure regulator, and the pressure sensor, the electronic controller and the variable geometry turbine position sensor are connected to the vehicle.

8. An engine exhaust system, comprising:
    a variable geometry turbine adapted to receive exhaust gasses exiting an engine;
    a compressed air reserve;
    a capsule pneumatically connected between the compressed air reserve and the variable geometry turbine;
    a pressure regulator pneumatically connected between the compressed air reserve and the capsule;
    a pressure sensor pneumatically connected between the pressure regulator and the capsule; and
    an electronic controller electrically connected to the variable geometry turbine position sensor, to the pressure regulator, and to the pressure sensor;
    wherein the electronic controller is adapted to periodically initiate a variable geometry turbine diagnostic routine; and
    wherein the variable geometry turbine diagnostic routine includes a sinusoidal control signal sent to the pressure regulator to actuate sinusoidal movement of the variable geometry turbine.

9. The engine exhaust system of claim 8 further comprising a variable geometry turbine position sensor operationally connected to the variable geometry turbine.

10. The engine exhaust system of claim 9 wherein the variable geometry turbine position sensor is electromechanical.

11. The engine exhaust system of claim 9 wherein the variable geometry turbine position sensor is optical.

12. A diagnostic system for engine systems having variable geometry turbines, comprising:
- a variable geometry turbine position sensor operationally connected to the variable geometry turbine;
- a compressed air reserve;
- a capsule pneumatically connected between the compressed air reserve and the variable geometry turbine;
- a pressure regulator pneumatically connected between the compressed air reserve and the capsule;
- a pressure sensor pneumatically connected between the pressure regulator and the capsule; and
- an electronic controller electrically connected to the variable geometry turbine position sensor, to the pressure regulator, and to the pressure sensor.

13. The diagnostic system of claim 12 wherein the electronic controller is adapted to periodically initiate a variable geometry turbine diagnostic routine.

14. The diagnostic system of claim 12 wherein the variable geometry turbine position sensor is integrally connected to the engine system.

15. The diagnostic system of claim 12 further comprising a diagnostic station operationally connectable to the engine system and wherein the variable geometry turbine position sensor is integrally connected to the diagnostic station.

* * * * *